T. C. DOBBINS.
RESILIENT WHEEL FOR MOTOR VEHICLES.
APPLICATION FILED DEC. 9, 1919.
1,369,329. Patented Feb. 22, 1921.
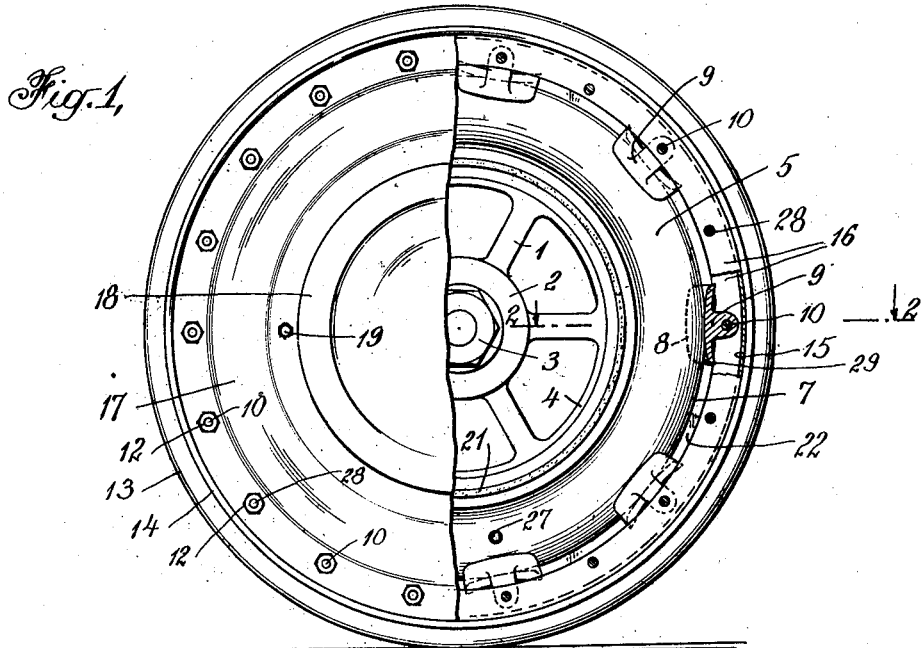
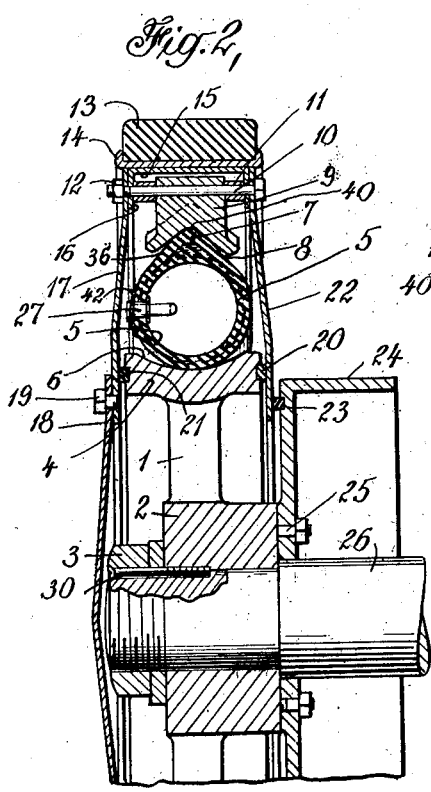
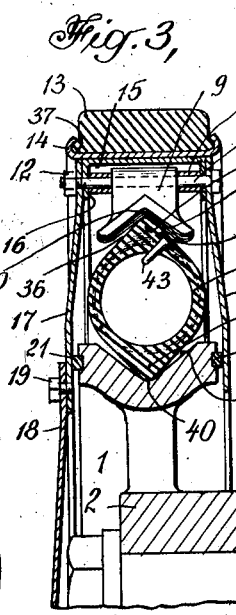
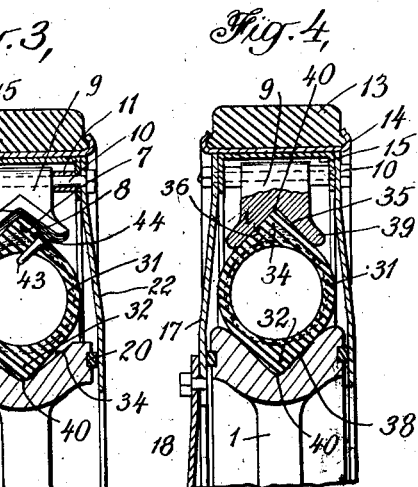
INVENTOR
Timothy C. Dobbins
BY
Harry Duncan
ATTORNEY

UNITED STATES PATENT OFFICE.

TIMOTHY C. DOBBINS, OF LOS ANGELES, CALIFORNIA, ASSIGNOR TO THE DOBBINS WHEEL COMPANY, OF DENVER, COLORADO, A CORPORATION OF COLORADO.

RESILIENT WHEEL FOR MOTOR-VEHICLES.

1,369,329.  Specification of Letters Patent.  Patented Feb. 22, 1921.

Application filed December 9, 1919. Serial No. 343,531.

*To all whom it may concern:*

Be it known that I, TIMOTHY C. DOBBINS, a citizen of the United States, now residing at Los Angeles, county of Los Angeles, State of California, have made a certain new and useful Invention Relating to Resilient Wheels for Motor-Vehicles, of which the following is a specification, taken in connection with the accompanying drawing, which forms part of this specification.

The invention in this application which is a continuation in part of my co-pending application, Serial No. 204,679, filed November 30, 1917, that is, contains subject-matter taken therefrom, relates especially to resilient wheels for motor vehicles, such as automobiles, motor trucks, and the like, in which a wheel center or hub member is resiliently connected with an inclosing wheel rim member through a pneumatic or other resilient cushioning device, while at the same time these two wheel members are provided with lateral guiding devices, such, for instance, as inclosing casing plates or means secured to the rim member so that undesirable lateral movement is prevented as the two wheel members move radially under running conditions. The pneumatic cushioning member is preferably provided on its outside or inside circumferential portion, or both, with an angular or V-shaped bearing portion adapted to coöperate with an angular or V-shaped groove in the working face of the adjacent member or rocking or otherwise mounted gripping shoes secured thereto. The grooved working faces into which the V-shaped portion of the cushioning device fits have preferably a somewhat greater angle so as to minimize frictional slipping or wear under running conditions.

In the accompanying drawing showing in a somewhat diagrammatic way various illustrative embodiments of this invention.

Figure 1 is a side elevation partly in section of one form of the invention.

Fig. 2 is a partial enlarged transverse section thereof taken substantially along the line 2—2 of Fig. 1.

Fig. 3 is a similar enlarged detail section showing another embodiment; and

Fig. 4 is a similar view showing still another form.

As illustrated in Figs. 1 and 2, an effective embodiment of the invention may comprise the wheel center member having a peripheral portion 4 which may be provided with a groove 6 to accommodate the resilient cushioning device and the spokes 1 may support this portion on the hub 2 of the wheel. Any suitable coöperating members may be used to mount and rotate the wheel, such as the axle 26, to which the hub may be secured as by the nut 3 illustrated as threaded on the outer end of the axle and locked in position with respect thereto and to the hub as by the threaded key member 30. If desired a suitable brake drum 24 may be secured to the hub or axle as by the bolts and nuts 25. The wheel rim member may be of any desired form and construction and may comprise the channeled rim member 15, the radial projecting flanges 16 of which may extend inward to the desired extent to secure the stiffness and strength desired in this part of the structure. Any suitable tire may be secured to the rim and a rubber cushioned tire 13 may be removably or permanently secured thereto in any suitable way as through the tire flange 14. By rigidly and permanently connecting these parts together a strong and light wheel rim member is secured which may be bodily removed from the wheel and replaced by another when necessary.

Suitable contact shoes or members may be mounted on either of the wheel members so as to coöperate with the interposed resilient cushioning device, and if desired the contact shoes 9 may be pivoted as by the bolts 10 and nuts 12 to the wheel rim member, tubular or other interposed bushings 11 maintaining lateral alinement of these parts. Thus these contact shoes have rocking movement substantially in the plane of the wheel and have a clamping or locking engagement with the interposed resilient cushioning device when any substantial angular movement takes place between the wheel members so as to clamp and lock the parts against any substantial slipping movement by the cam action of these rocking shoes of which six to twelve may be used. If desired these contact shoes may have an angular or V-shaped groove 8 in their working faces to have an alining action on the coöperating pneumatic or other resilient cushioning device, such as 5, which is preferably provided with an angular outer edge 36 coöperating with the contact shoes and preferably having a slightly less angle so that the initial contact between these parts occurs adjacent the outer portion of the cushioning device which may with advantage be somewhat rounded as at 40. By making the normal angle of this V-shaped pneumatic cushioning device 10 degrees or so less than the angle of the coöperating grooved contact shoes, increase of pressure between these two parts causes a gradual enlargement of their contact area which takes place without undesirable friction or wear when the angular edge 7 of the pneumatic cushioning device is reinforced as with canvas or the like, as indicated in the drawing. Good results are secured by making the angle of this V-shaped outer edge of the cushioning device about 90 degrees when it is normally inflated and by making the V-shaped groove in the rocking shoes 100 to 110 degrees or so. Under these conditions the contact area of each shoe with the resilient cushioning device automatically varies with each revolution of the wheel and still greater ranges of variation of course occur when the wheel passes over a bump or obstruction in the road, these movements and changes of contact area taking place gradually because of the resilient action of the pneumatic cushioning device in such a way as to give a minimum of frictional slip and wear and at the same time to exert a desirable alining action between the parts. Under running conditions the progressive embedding of the contact shoes in the cushioning device causes a gradual creep of the shoes around the same, so that the shoes creep around the cushioning device to the extent of a number of inches for every mile that the wheel travels, thus equalizing the wear and minimizing localized or destructive action between the parts. If desired, the inner edge of the cushioning member 5 may be substantially circular in cross-section and coöperate with a peripheral groove which is in the wheel center member, this groove being advantageously of somewhat greater radius than the cushioning member so as to make center contact therewith in the first instance. The pneumatic cushioning device which may be in the form of a single tube pneumatic tire of special construction, for instance, may have an air valve such as 27 arranged in one lateral side thereof and preferably having its attached rubber flange 42 cemented or vulcanized to the tire so that the valve is substantially flush therewith on the outside and interferes to a minimum degree with the operation of the device while still allowing inflation of this inner pneumatic tire or cushioning device when necessary.

It is desirable to have suitable lateral guiding means to maintain the lateral alinement of the wheel members under operating conditions and this can be secured and at the same time a desirable reinforcement of the wheel rim member insured by the use of lateral guiding and closing plates such as 17, 22, which may fit snugly within the tire flange 14 or other parts of the rim member and be securely bolted in place as by suitable nuts 12 and bolts 10, 28 passing through the rim flanges 16, as shown in Figs. 1 and 2. These plates may be of such thickness and strength as to greatly add to the rigidity of the wheel rim member and may also have the added function of substantially inclosing the resilient cushioning device and its related working parts so as to protect the same against dust, dirt, etc. These plates may be formed with substantially radial portions adjacent the wheel center member so as to have a lateral guiding action thereon and any suitable bearing members may be interposed between these parts, such as the anti-friction graphitized rings or bearing members 20, 21 of graphitized asbestos or other suitable anti-friction packing material which may be screwed or otherwise secured to the parts and may fit into annular retaining grooves in the peripheral portion 4 of the wheel center member as indicated. If desired, a central cover plate, such as 18, may be bolted on the outside of the wheel as by the bolts 19 so as to inclose the hub and give the wheel a more finished ornamental appearance and also add somewhat to the strength and stiffness of the wheel rim portion as well as prevent access of dirt and dust to the hub. If desired, anti-friction or packing members, such as 23, may be interposed between the plate 22 and the brake drum 24 so as to prevent dirt or dust working into these parts while still allowing radial movement of the two wheel members. With this arrangement the radial movement or play between the resiliently connected wheel members can take place with sufficient freedom under running conditions, while at the same time the strong or resilient guiding plates prevent undesirable lateral movement of these wheel members and give the wheel desirable stiffness and rigidity so as to resist any wabbling tendency which might be caused by irregular road conditions.

It is in some cases desirable to have the resilient cushioning member formed on both its inner end and outer circumferential edges with angular alining portions coöperating with V-shaped grooves in the wheel members or attached contact shoes secured thereto, and Fig. 3 shows such an arrangement in which the pneumatic cushioning device 31 is formed with a V-shaped or angular inner edge 32 having a somewhat rounded portion 40 as indicated. The V-shaped groove 34 in the wheel center member with which this portion of the cushioning device coöperates may with advantage have a somewhat greater angle so that the additional 10 degrees or so of clearance causes the first contact between these parts to occur near the extreme inner edge 40 of the reinforced cushioning device and have a similarly desirable freedom from destructive frictional slip or wear between these parts. In some cases the inflating valve for the pneumatic cushioning member may be arranged in the angular working face thereof, the air valve 43 being shown in this position with its outer portion countersunk slightly in the angular bearing portion 7 of the cushioning device and normally covered by a resilient soft rubber cap 44 which may be forced in place to keep out dirt and render this part of the cushioning device substantially flush with adjacent portions thereof. The other parts of this Fig. 3 arrangement may be substantially similar to the form of wheel previously described, although the tire 13 is shown as formed with a clencher bead 37 to be more securely held in place by the tire flange 14. It is not in all cases necessary to have the angle of the V-shaped working faces of such a cushioning device substantially different from the V-shaped grooves in the coöperating members and in fact an increased alining action is secured when these angles are normally substantially the same in one or both circumferential edges of the cushioning member, as shown in Fig. 4. In that instance the working faces 39 of the contact members may have a V-shaped groove 35 of substantially the same angle as the V-shaped outer circumferential edge 36 of the cushioning device and in the same way the V-shaped groove 38 in the periphery of the wheel center member may have the same angle as the angular surface or bearing portion of the inner circumferential edge 32 of the cushioning device.

This invention has been described in connection with a number of illustrative embodiments, parts, proportions, forms, materials and methods of construction and use, to the details of which disclosure the invention is not of course to be limited, since what is claimed as new and what is desired to be secured by Letters Patent is set forth in the appended claims.

I claim:

1. In resilient wheels, a wheel center member having a peripheral V-shaped groove, an encircling wheel rim member provided with a tire, an interposed pneumatic resilient cushioning device fitting within the peripheral groove in said wheel center member, a series of cam contact shoes pivoted to said wheel rim member to rock substantially in the plane thereof and having working faces formed with V-shaped grooves coöperating with the outside of said cushioning device, said cushioning device having alining V-shaped outer and inner edges of less angular extent than the coöperating angular grooves in said contact shoes and wheel center member to minimize friction, lateral guiding and inclosing plates secured to said wheel rim member and inclosing said cushioning device to substantially maintain the lateral alinement of said wheel members under running conditions and inclose and protect said cushioning device and adjacent parts.

2. In resilient wheels, a wheel center member having a peripheral V-shaped groove, an encircling wheel rim member, an interposed resilient cushioning device fitting within the peripheral groove in said wheel center member, a series of cam contact shoes pivoted to one of said wheel members to rock substantially in the plane thereof and having working faces formed with V-shaped grooves coöperating with said cushioning device, said cushioning device having V-shaped outer and inner edges of considerably less angular extent than the coöperating angular grooves in said contact shoes and wheel center member to minimize friction and lateral guiding means to substantially maintain the lateral alinement of said wheel members under running conditions.

3. In resilient wheels, a wheel center member, an encircling wheel rim member, an interposed pneumatic resilient cushioning device fitting within the peripheral groove in said wheel center member, a series of cam contact shoes pivoted to one of said wheel members to rock substantially in the plane thereof and having working faces formed with V-shaped grooves coöperating with said cushioning device, said cushioning device having an alining V-shaped edge of less angular extent than the coöperating angular grooves in said contact shoes to minimize friction.

4. In resilient wheels, a wheel center member having a peripheral groove, an encircling wheel rim member provided with a tire, an interposed pneumatic resilient cushioning device fitting within the peripheral groove in said wheel center member, a series of cam contact shoes pivoted to said wheel rim member to rock substantially in the plane thereof and having working faces formed with grooves the side walls of which being normally spaced from the outside of said cushioning device to permit a slow creeping movement of the cushioning device under running conditions, lateral guiding and inclosing plates secured to said wheel rim member and inclosing said cushioning device and bearing members on said wheel center member engaging said guiding plates to substantially maintain the lateral alinement of said wheel members under running conditions and protect said cushioning device and adjacent parts.

5. A resilient wheel of the character described comprising a wheel center member having an outwardly facing trough, rim members having inwardly facing troughs encircling said wheel center member, said troughs having diverging walls, a resilient member located between said troughs and provided with working surfaces, said surfaces being oppositely inclined and adapted to normally contact adjacent their inner and outer peripheries only with the peripheries of said troughs, and means disposed laterally of said resilient member adapted to maintain said wheel members in substantial lateral alinement under running conditions.

6. A resilient wheel of the character described comprising a wheel center member having an outwardly facing trough, rim members having inwardly facing troughs encircling said wheel center member, said troughs having diverging walls, a resilient member located between said troughs and provided with working surfaces, the divergence of said walls being greater than the inclination of said surfaces whereby only the inner and outer peripheries of said surfaces will normally contact with the peripheries of said troughs, and means disposed laterally of said resilient member adapted to maintain said wheel members in substantial lateral alinement under running conditions.

7. A resilient wheel of the character described comprising a wheel center member, an encircling rim member, a cushioning device interposed between said rim and said center members having V-shaped inner and outer working edges adapted to normally contact adjacent their peripheries only with correspondingly formed working surfaces of said rim and center members, and means adapted to maintain the lateral alinement of said wheel members under running conditions.

8. A resilient wheel of the character described comprising a wheel center member having an outwardly facing trough, rim members having inwardly facing troughs encircling said wheel center member, said troughs having diverging walls, a pneumatic member located between said troughs and provided with working surfaces, the divergence of said walls being greater than the inclination of said surfaces whereby only the inner and outer peripheries of said surfaces will normally contact with the peripheries of said troughs, means carried by said pneumatic member and disposed between said inner and outer peripheries for inflating and deflating said pneumatic member, and means disposed laterally of said pneumatic member adapted to maintain said wheel members in substantial lateral alinement under running conditions.

TIMOTHY C. DOBBINS.